(12) United States Patent
Llairo et al.

(10) Patent No.: US 9,276,718 B2
(45) Date of Patent: Mar. 1, 2016

(54) METHOD AND A SYSTEM FOR BANDWIDTH AGGREGATION IN AN ACCESS POINT

(75) Inventors: Eduard Goma Llairo, Madrid (ES); Konstantina Papagiannaki, Madrid (ES); Yan Grunenberger, Madrid (ES)

(73) Assignee: Telefonica, S.A., Madrid (ES)

( * ) Notice: Subject to any disclaimer, the term of this patent is extended or adjusted under 35 U.S.C. 154(b) by 26 days.

(21) Appl. No.: 14/233,477

(22) PCT Filed: Jul. 19, 2012

(86) PCT No.: PCT/EP2012/064179
§ 371 (c)(1),
(2), (4) Date: May 9, 2014

(87) PCT Pub. No.: WO2013/011088
PCT Pub. Date: Jan. 24, 2013

(65) Prior Publication Data
US 2015/0117328 A1 Apr. 30, 2015

Related U.S. Application Data

(60) Provisional application No. 61/510,158, filed on Jul. 21, 2011.

(51) Int. Cl.
*H04W 88/08* (2009.01)
*H04L 5/00* (2006.01)
(Continued)

(52) U.S. Cl.
CPC ............ *H04L 5/0044* (2013.01); *H04L 45/245* (2013.01); *H04W 28/08* (2013.01); *H04W 88/08* (2013.01); *H04W 92/12* (2013.01); *H04W 92/20* (2013.01)

(58) Field of Classification Search
CPC ...... H04W 28/08–28/10; H04W 88/08–88/12; H04W 92/10–92/14; H04W 92/18–92/24; H04L 41/0893; H04L 41/0896; H04L 45/245; H04L 5/0044
See application file for complete search history.

(56) References Cited

U.S. PATENT DOCUMENTS 5,845,192 A * 12/1998 Saunders ..................... 455/11.1
7,773,555 B1 * 8/2010 Johnson ....................... 370/328
(Continued)

OTHER PUBLICATIONS

Domenico Giustiniano, et al., "ClubADSL: When Your Neighbors are Your Friends," IEEE Symposium on, 2009,IEEE, Piscataway, NJ, pp. 25-29, XP031510651.
(Continued)

*Primary Examiner* — Xavier S. Wong
(74) *Attorney, Agent, or Firm* — Sughrue Mion, PLLC

(57) ABSTRACT

A method and a system for providing communication between at least one wireless client device through a connectivity to a corresponding dedicated access point, as well as locating and recognizing a plurality of neighboring access points, the method including notifying, by the dedicated access point, a predetermined absence period to a wireless client device to which the dedicated access point communicates, the dedicated access point becoming a client to a second access point during the predetermined absence period, receiving, by the dedicated access point as a client, data corresponding to a backhaul bandwidth of the at least second access point and aggregating the received backhaul data from the second access point to the dedicated access point's own backhaul data, and sending, by the dedicated access point, the aggregated backhaul bandwidth data to the wireless client device after the predetermined absence period has lapsed.

16 Claims, 5 Drawing Sheets

(a) Client-based solution.

(b) AP-based solution

(51) Int. Cl.
*H04L 12/709* (2013.01)
*H04W 28/08* (2009.01)
*H04W 92/12* (2009.01)
*H04W 92/20* (2009.01)

(56) References Cited

U.S. PATENT DOCUMENTS

| 2005/0135422 | A1 | 6/2005 | Yeh |
| 2007/0217373 | A1 | 9/2007 | Kotzin et al. |
| 2007/0225029 | A1* | 9/2007 | Abusch-Magder ............ 455/525 |
| 2008/0248807 | A1* | 10/2008 | Kim et al. ...................... 455/453 |
| 2009/0213825 | A1* | 8/2009 | Gupta et al. ................... 370/338 |
| 2011/0019551 | A1* | 1/2011 | Adams et al. .................. 370/235 |
| 2012/0188950 | A1* | 7/2012 | Luo et al. ....................... 370/329 |
| 2013/0035033 | A1* | 2/2013 | Sanneck ............... H04W 24/04 455/9 |

OTHER PUBLICATIONS

International Search Report for PCT/EP2012/064179, dated Sep. 20, 2012.

\* cited by examiner (a) One client.    (b) The second client arrives.

(a) CLIENT-BASED AGGREGATION CAPACITY (b) AP-BASED AGGREGATION CAPACITY (a) CLIENT-BASED AGGREGATION CAPACITY 2

(b) AP-BASED AGGREGATION CAPACITY 2

METHOD AND A SYSTEM FOR BANDWIDTH AGGREGATION IN AN ACCESS POINT

CROSS REFERENCE TO RELATED APPLICATIONS

This application is a National Stage of International Application No. PCT/EP2012/064179, filed Jul. 19, 2012, claiming priority from U.S. Provisional Patent Application No. 61/510,158, filed Jul. 21, 2011, the contents of all of which are incorporated herein by reference in their entirety.

FIELD OF THE ART

The present invention generally relates, in a first aspect, to a method for bandwidth aggregation in an access point, said bandwidth aggregation performed in said access point by using a single-radio access point solution in order to increase clients' connectivity speed.

A second aspect of the invention relates to a single-radio Access Point deployment system for bandwidth aggregation in order to increase clients' connectivity speed. The system is adapted for implementing the method of the first aspect.

PRIOR STATE OF THE ART

Over the last decade, Internet access speeds have significantly increased due to new network deployments such as xDSL, Fiber To The Home (FTTH) or cable. Out of these technologies, the most widespread is xDSL that can offer speeds of up to 50 Mbps to users that are close to the DSLAM if the telephone cables are in good conditions. However, the reality is that in many regions, the Internet access speeds remain low (e.g. below 5 Mbps).

Wireless backhaul bandwidth aggregation has been proposed as a means to increase users' connectivity speed with minimal changes to the existing network deployment, as detailed Giustiniano et al. in the Fair WLAN Backhaul Aggregation (In Proc. of MobiCom'10 (2010)) or Kandula, S. et al. in FatVAP: Aggregating AP Backhaul Capacity to Maximize Throughput (In Proc. of NSDI'08 (2008)). In addition, commercial initiatives like FON aim to create nation-wide WiFi sharing communities that offer the possibility for users to connect to the Internet when they are away from home if they are close to an access point (AP) from the community. Internet Service Providers (ISPs) running wired and cellular access networks see WiFi sharing as an opportunity to offload traffic from the cellular network, and backhaul bandwidth aggregation is a mean for them to increase the quality of their service while they improve their backhaul networks.

However, taking an academic concept to a commercial deployment brings up a number of factors that need to be considered. First, the overall solution costs must be kept low. Thus, introducing extra hardware or requiring highly specialized devices is not an option. Second, the deployment of the solution must not be too complex. Then, the solution must require modifications to the smallest number of devices possible.

Current backhaul bandwidth aggregation solutions, as detailed before, require driver modifications on the wireless clients to enable such scheme. Each wireless client needs to feature a virtualized wireless card. This implies that for a commercial deployment one would need to modify the operating system and wireless driver of every possible WiFi client, including smartphones, tablets, laptops, etc. As one may realize, the cost of such an approach is absolutely prohibitive.

The problem of the diversity of devices that need to be modified can be solved by deploying the aggregation scheme in a much smaller set of devices such as the APs, which are usually provided by ISPs. However, current methods to perform aggregation with single-radio devices are not meant to be used in APs. Introducing a secondary WiFi radio in the APs could provide a technical solution, but it increases the cost of a device that is subsidized by the ISP, making the solution impracticable.

These State of the art client-based aggregation schemes also propose the use of TDMA to enable a single-radio client to connect to all the neighboring APs regardless of their frequency of operation. Over cycles of 100 ms the wireless client sequentially connects to all selected APs within range in a round robin fashion (shown in FIG. 1). Using the standard 802.11 power saving feature, a client is able to notify its absence to the APs it is connected to so that they buffer packets directed to it. This way, a client performing aggregation appears to be sleeping in all APs but the one that is currently scheduled in the round robin cycle.

When a client finishes the time allocated to one AP, sends a packet to announce to the AP that is going to power saving mode and that it must buffer packets directed to it. Then the client tunes the WiFi card to the frequency of the next AP in the TDMA cycle and sends a packet to announce its presence and receive all the packets the AP buffered. During the time in which the client is switching frequencies, it cannot send/transmit data. This time is called switching time and for state of the art systems it is 1.5 ms.

As the backhaul capacity and the wireless link capacity from the client to each AP might be different, client-based aggregation systems must optimize the percentage of time devoted to each AP. Kandula, S. et al propose to maximize the individual throughput of each client. In contrast, Giustiniano et al. show that individual throughput maximization can result in severe unfair throughput distribution and optimizes for weighted proportional fairness to achieve a good compromise between network resource utilization and fairness. In both systems, the throughput obtained from each AP is controlled by the percentage of time devoted to it in the TDMA cycle. Note that a client might be able to collect all the backhaul capacity of neighboring APs and have spare time in which the WiFi card can go to power saving mode and reduce the energy consumption of the system.

Other known backhaul aggregation solutions are disclosed, for instance, in patent applications US-A1-2007/0217373 and/or US-A1-2005/135422.

Patent application US-A1-2007/0217373 relates to a method and a system of communicating data that include dynamically selecting a first backhaul site from a plurality of backhaul sites that are each configured to wirelessly communicate with a particular access point. At least one transmission parameter used to communicate a first backhaul data stream between the access point and the first backhaul site can be dynamically configured. On contrary of present invention, the solution proposed in said patent application does not provide that a dedicated access point providing communication to a wireless device being able to notify an absence period to said wireless device and acting as a client of at least a second access point during said absence period in order to aggregate backhaul data.

Patent application US-A1-2005/135422 provides a mechanism for relaying messages via a wireless medium within a network environment in which an access point, as in the present invention, is able to operate as client in respect to other access points, however, on contrary of the present invention this operation is not preformed during any absence period notification to the respective client device.

The only way to proceed is to develop a solution that can enable the desired functionality simply through software AP modifications and without any client support. The present invention presents AGGRAP, a single-radio AP that makes possible a commercial deployment of wireless backhaul aggregation. AGGRAP is able to aggregate the unused capacity of neighboring APs regardless of their wireless channel and redirect it to off the shelf clients.

The invention contributions can be summarized as follows: 1) it proposes a feasible and cost-effective backhaul bandwidth aggregation solution, 2) it formulates the problem of wireless backhaul bandwidth aggregation through a single-radio AP that acts as an AP to its clients, and as a client to neighboring APs, and show that the problem can be mapped to the client-based solutions allowing the same optimization objectives, 3) it evaluates the performance trade-off of the AP- and client-based solutions analytically and experimentally, and 4) it implements AGGRAP and show that it is able to aggregate bandwidth from neighboring backhauls and increase the throughput of different types of off-the-shelf clients like laptops or smartphones.

DESCRIPTION OF THE INVENTION

The object of the present invention is to provide a solution to enable WiFi backhaul aggregation with only access point's modifications, and without the need for additional radio hardware in order to increase upload and download throughput when clients are in range of participating APs.

To that end, the present invention in a first aspect provides a method for bandwidth aggregation in an access point, the method as per common use in the field comprising providing communication between at least one wireless client device through a connectivity to a corresponding dedicated access point, as well as locating and recognizing a plurality of neighboring Access Points'.

On contrary to the known proposals and in a characteristic manner the method comprises following actions:

a) notifying, said dedicated access point, a predetermined absence period to said at least one wireless client device it provides communication;

b) during said predetermined absence period, said dedicated access point becoming a client to at least a second access point;

c) receiving, said dedicated access point as a client, data corresponding to a backhaul bandwidth of said at least a second access point and aggregating said received backhaul data from said at least a second access point to its own backhaul data; and d) sending, said dedicated access point, said aggregated backhaul bandwidth data to said at least one wireless client device after the predetermined absence period has lapsed.

In a preferred embodiment, the dedicated access point performs the connectivity and the bandwidth aggregation by using a single-radio access point solution which aggregates the spare bandwidth of said at least second access point within communication range regardless of their channel of operation.

In another embodiment, the dedicated access point only sends the aggregated backhaul bandwidth data to said at least one wireless client device, immediately after the predetermined absence period has lapsed.

The predetermined absence period has a value, calculated by using a Network Allocation Vector (NAV), such that said at least one wireless client device maintain association with the dedicated access point. According to an embodiment, said value has a maximum duration of 32 msec.

In another embodiment, the dedicated access point only acts as a client to said at least second access point when its backhaul bandwidth utilization exceeds 80% of its capacity.

Then, the dedicated access point announces to said at least second access point, through Beacon frames, the backhaul bandwidth capacity as well as their available-for-aggregation throughput in order to enable a derivation of an appropriate Time Division Multiple Access (TDMA) schedule.

The traffic from said at least one wireless client device in said dedicated access point is prioritized in order to ensure that spare capacity of said backhaul bandwidth is used for assistance.

Finally, according to another embodiment, the backhaul bandwidth aggregation is performed by guaranteeing an equal and fair sharing between the access points.

A second aspect of the present invention provides a system for bandwidth aggregation in an access point, the system as per common in the field, comprising:

at least one wireless client device and a dedicated access point to which said wireless client device establishes a communication; and said at least one dedicated access point having a connectivity capability to locate and recognize a plurality of neighboring access points.

In the system in a characteristic manner, said dedicated access point is further adapted to act as a normal access point providing communication to said at least one wireless client device and to act as a client to at least a second access point of said plurality of neighboring access points in order to perform a bandwidth aggregation of said at least second access point.

According to an embodiment, the communication between access points and communication between access point and wireless client device is established by a single-radio access point solution.

According to another embodiment, the single-radio access point solution is located in said dedicated access point and can be located in a different or in the same communication channel of said at least second access point.

Finally, in said single-radio access point solution the at least one wireless client device remain unmodified during the communication.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

The goal of the present invention is to provide a WiFi backhaul aggregation deployable solution. To this end, the solution fulfills the following four requirements:

Single-radio APs: the solution must not increase the cost of the existing hardware.

Unmodified WiFi clients: to provide aggregation to all types of devices, it requires no modifications to existing WiFi clients.

Limited overhead: WiFi aggregation targets only the primary AP's immediate neighbors, i.e. it does not introduce connections that transit more than 2 wireless hops.

Backhaul connections primarily dedicated to serve owner's devices: AGGRAPs only aggregate unused bandwidth from neighboring APs.

The high level architecture is that of a community that enables its subscribers to connect to any AP participating in the sharing scheme. Beyond the traditional WiFi sharing, such as FON, in the invention architecture it is not only users that connect to participating APs, but also other APs in order to make use of the additional backhaul capacity. As such, AGGRAP is designed to switch between two modes: i) serving its clients, and ii) acting as a client to other participating APs in order to increase the uplink/downlink throughput to its clients. The latter function is further triggered only when the backhaul link utilization of the primary AP exceeds 80%, a case when assistance becomes desirable.

To realize the full potential of backhaul bandwidth aggregation, AGGRAPs must be able to act as clients of APs operating in a different channel. As one of the requirements is to have single-radio APs, making AGGRAP connect to APs in different frequencies is a challenge that we address in the following section.

Figure 1:
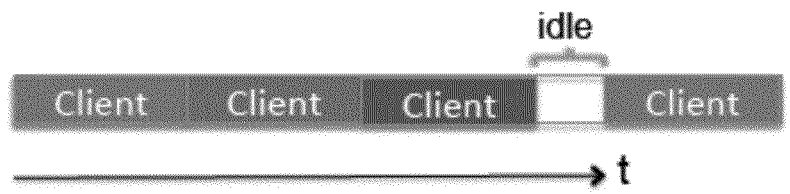
FIG. 1 is an example of a wireless client TDMA aggregation cycle.
Figure 2:
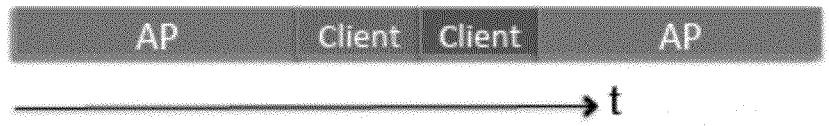
FIG. 2, is an example of a wireless AP TDMA aggregation cycle.

To perform bandwidth aggregation using a single-radio AP regardless of the channel of neighboring APs, the TDMA cycle used in client-based aggregation systems needs to be adapted to account for the AP functionalities. AGGRAP must spend the appropriate amount of time in its own frequency forwarding data to its clients collected over its backhaul link and those of its neighboring APs (as shown in FIG. 2). As such, the scheduling decision is slightly more complicated. Furthermore, the invention needs to address one more challenge—that if the AGGRAP leaves its own frequency to utilize the backhaul links of other APs, it may lose packets sent by its clients or even lead them to disconnection. This latter problem was not there in previous client-based formulations since clients have the ability to indicate to their APs that they are going to disappear for a while, usually to enter power save mode, and that the AP should buffer packets for later delivery. However, such functionality is not present for APs, which are assumed to be always on when they have clients associated with them. The invention addresses this issue through the use of the Network Allocation Vector (NAV).

NAV is a counter that each 802.11 device has and represents the amount of time the previous transmission will need before being completed. Prior to transmitting a packet, any 802.11 device estimates the time it will take to send it given the transmission rate and packet length and writes this value into the duration field of the packet MAC header. The other devices in range update their NAV according to the duration field of the packets they receive. This way, none of the 802.11 devices in range will try to access the medium until the end of the transmission. AGGRAP uses the NAV to reserve the channel for the amount of time it will be out of its AP channel. Then, before leaving its primary channel of operation, it sends a packet to a dummy MAC address (if the channel reservation packet is transmitted to one of the clients of the AGGRAP, this clients might start transmitting at the end of the reception of the packet) with a duration field equal to the amount of time it will be acting as a client for all the other APs. The maximum value of the duration field is $\approx 32$ ms (15 bits to indicate the duration in microseconds).

The invention so far addresses the first three requirements. To address the forth requirement, it makes sure that AGGRAPs connect to neighboring APs only when they utilize their backhaul link by more than 80%. To further enable the derivation of an appropriate TDMA schedule, AGGRAPs announce through Beacon frames their backhaul link capacity, as well as their available-for-aggregation throughput, i.e. the part of their capacity that is not utilized by their clients. Both values are reported in Mbps and are computed using weighted moving averages, updated every 1s. To further ensure that only the spare capacity of backhaul links is used for assistance, client traffic is prioritized at the AP. Such prioritization happens through the knowledge of which MAC addresses appear as APs, as well as clients. The MAC addresses that act in two roles (e.g. AGGRAPs) across time are classified as lower priority "clients" and the traffic directed to them is not taken into account in the computation of the available-for-aggregation throughput.

Using the NAV to reserve a channel is an effective measure to silence all the clients and prevent packet losses in the AGGRAP SSID. However, this effect is not limited to the AGGRAP WLAN and will also silence any neighboring network in range using the same channel. Thus, an AGGRAP performing aggregation might reduce the available air-time of neighboring WLANs.

The impact of AP-based aggregation on other networks depends on multiple factors like the number of overlapping networks, the timing of high bandwidth demand of different users or the percentage of time an AGGRAP is collecting bandwidth from other APs. A solution to the potential loss of resources from silencing entire contention domains is to standardize the functionality of notifying to all the clients inside an SSID that the AP will not be available for a period of time. Actually, WiFi direct has already specified this functionality to enable power saving for an AP. In WiFi direct, this is called Notice of Absence and allows 802.11 devices to communicate a planned power-down period. Notice that such functionality can also be useful in pacing uplink traffic.

Figure 3:
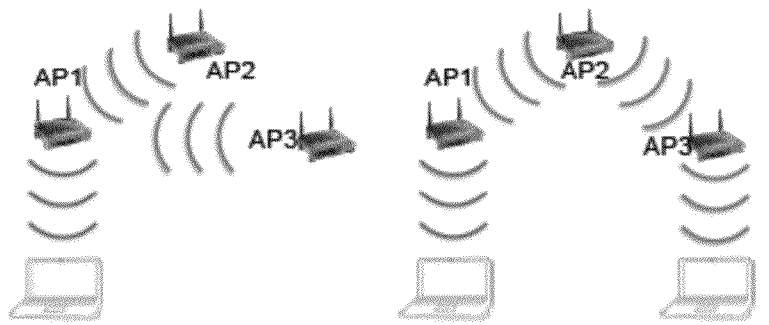
FIG. 3 is an embodiment of the bandwidth aggregation scheme of the present invention. One client obtains the aggregated bandwidth from three APs, when a second client connects to its AP, the network topology changes.

FIG. 3 demonstrates according to an embodiment this high level design in a three household scenario. In this particular case, all three AGGRAPs are within wireless range of each other. Initially, the network features a single client that connects to its home AP (AP1). Given that the traffic requirements exceed the capacity of the backhaul link, AP1 connects to AP2 and AP3 to access more wired capacity. The client of AP1 is able to aggregate the capacity of all 3 backhaul links of 3 Mbps each. At time 300 seconds a second client appears in the network, and connects to its home AP (AP3).

Given that both clients require more throughput than their backhaul links can provide, they use AP2 for assistance. The system is able to provide a fair share of the backhaul capacity of AP2, leading to an effective throughput of 4.5 Mbps for each client.

Formulation:

TABLE 1

Definition of variables used in the formulation of the AP-based aggregation system

| Variable name | Definition |
| --- | --- |
| $b_i$ [Mbps] | Backhaul capacity of $AP_i$ |
| $\omega_{ij}$ [Mbps] | Wireless capacity from $AP_j$ to $AP_i$ |
| $\omega_{ii}$ [Mbps] | Wireless capacity from $AP_i$ to its clients |
| $f_{ii} \in (0, 1]$ | Time share that $AGGRAP_i$ devotes to act as an AP |
| $f_{ij} \in [0, 1)$ | Time share that $AGGRAP_i$ devotes to act as a client of $AP_j$ |

TABLE 2

Definition of variables used in the formulation of the AP-based aggregation system mapped into the client-based solution

| Variable name | Definition |
| --- | --- |
| $\omega_i^1$ [Mbps] | Wireless capacity from $AP_i$ to AGGRAP's clients |
| $f_i^1 \in (0, 1]$ | Time share that $AGGRAP_i$ devotes to data coming from backhaul $b_i$ |

Table 1 and Table 2 show the different definitions used for the formulation of the AP-based aggregation system of the present invention.

AGGRAPs act as normal APs until their clients saturate their backhaul capacity. When AGGRAP's primary clients saturate its backhaul capacity i.e. their utilization is higher than 80% of the backhaul capacity, it will scan for neighboring APs that can provide additional capacity. Out of all the neighboring APs with available backhaul capacity, AGGRAPs select the four APs with best signal to noise ratio (SNR) because it has been shown in [1, 7] that in typical residential environments clients are in range of 4-5 APs with a wireless channel that offers more than 5 Mbps. AGGRAPs will assist neighboring APs when they are utilized less than 70%. We leave a 10% margin to avoid AGGRAPs oscillating between the two modes. At that point in time, each AGGRAP needs to compute how much time it will spend serving its own client, and how many additional APs it will connect to and for how long. The invention scheme comes up with such a schedule aiming to optimize for weighted proportional fairness, which offers a good compromise between fairness and an efficient utilization of the network resources.

Figure 4:
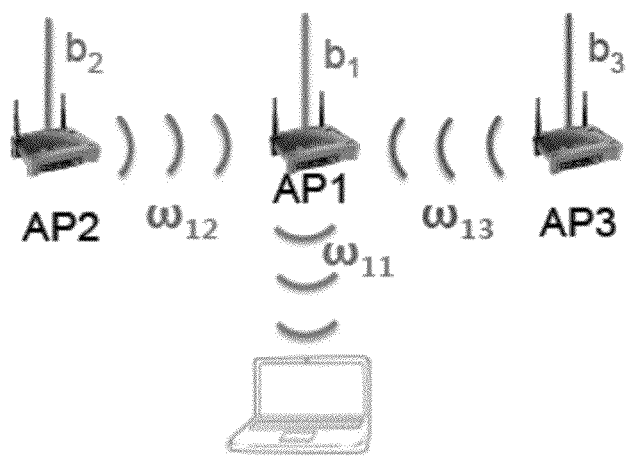
FIG. 4 is an embodiment of the bandwidth aggregation scheme with three APs and one client.

FIG. 4 shows an embodiment where only one of the three APs has a client that requires maximum speed connectivity. Each AP is connected to a backhaul link $b_i$, and the client is connected to its home AP with a wireless channel of effective throughput $\omega_{11}$. $AGGRAP_1$ will try to get the capacity from the two neighboring APs and send the aggregate to its clients. The percentage of time that $AGGRAP_1$ needs to be acting as an AP to be able to send all the backhaul capacity to its clients is:

$$f_{11} = \frac{\sum_{\forall i} b_i}{\omega_{11}} \quad (1)$$

where $b_i$ is the backhaul bandwidth of AGGRAPi, $\omega_{ij}$, is the wireless speed at which $AP_i$ can receive data from $AP_j$ and $l_{ii}$ is the wireless speed at which $AP_i$ can transmit data to its clients. The values of $\omega_{ij}$ are estimated following the same process as in Giustiniano et al. while each AP knows its $b_i$. Note that we consider wireless capacity as the TCP throughput that a client connected 100% of the time to the AP would obtain using 802.11.

The percentage of time required to obtain the bandwidth from neighboring APs is $$f_{1j} = \frac{b_j}{\omega_{1j}} \quad (2)$$

where $\omega_{1j}$ is the wireless speed at which $AGGRAP_1$ can communicate with $AP_j$, and $f_{1j}$ is the percentage of time that $AGGRAP_1$ spends acting as a client of $AP_j$. If $\Sigma_{550} f_{1j} < 1$, $AGGRAP_1$ has enough time to aggregate all the backhaul bandwidth and send it to its client.

However, depending on the wireless channel quality and the capacity of the backhaul links it will not always be possible for AGGRAPs to aggregate all the available capacity. In these situations it is necessary to optimize the time allocation to obtain a weighted proportionally fair throughput distribution among APs. If then it is formulated the problem of $f_{ij}$ allocation, it can be seen that $f_{ii}$ (the time $AGGRAP_i$ spends acting as an AP for its clients) must not be smaller than $$\frac{b_{ij}}{\omega_{ii}}/$$

and it must also account for the time required to send the data that has been collected from other APs (i.e.

$$\frac{f_{i2} \times \omega_{i2}}{\omega_{ii}}/$$

for $AP_2$). Then $f_{ii}$ satisfies:

$$f_{ii} = \frac{b_i}{\omega_{ii}} + \sum_{\forall j \neq i} \min\left(\frac{f_{ij}\omega_{ij}}{\omega_{ii}}, \frac{b_j}{\omega_{ii}}\right)$$

where min $$\left(\frac{f_{ij}\omega_{ij}}{\omega_{ii}}/, \frac{b_j}{\omega_{ii}}/\right)$$

models the percentage of time required to transmit the data that can be obtained from $AP_j$. The limit imposed by $$\frac{b_{ij}}{\omega_{ii}}/$$

is only active when $AGGGRAP_i$ has enough time to aggregate and transmit all the backhaul data. In all other situations, the amount of bandwidth that can be obtained from $AP_j$ is given by the percentage of time using the link multiplied by its capacity ($f_{ij}\omega_{ij}$). Additionally, $$\sum_{\forall j} f_{ij} \leq 1,$$

$$f_{ij} \leq \frac{b_j}{\omega_{ij}}, \forall j \neq i,$$

There is no closed form solution for the problem stated above. However, it is possible to map the problem of $f_{ij}$ allocation at the AGGRAPs to the problem already solved in Giustiniano et al. of wireless backhaul aggregation from the clients.

Figure 5:
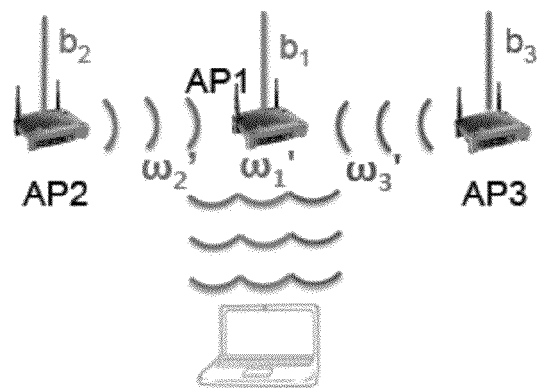
FIG. 5 shows an embodiment with an overlay wireless channels corresponding to each backhaul link.

FIG. 5 shows how to allocate air time data flow when the three sources of bandwidth are available. In this case, the invention defines an overlay wireless channel per each backhaul link and the percentage of time needed to transmit data over a certain overlay channel is given by the ratio.

$$f'_i = \frac{b_i}{\omega'_i}$$

where $b_i$ is the backhaul bandwidth available and $\omega'_i$ is the wireless capacity of the overlay channel. Comparing FIG. 4 and FIG. 5 it can be seen that $$f'_1 = \frac{b_1}{\omega'_1}/$$

where $\omega'_1 = \omega_{11}$. Nevertheless, to compute $$f'_2 = \frac{b_2}{\omega'_2}/$$

it is necessary to know $\omega'_2$. Now $\omega'_2$ needs to model the wireless capacity of the channel that links the backhaul link of capacity $b_2$ with the wireless client. Then, $\omega'_2$ can be obtained using the time required to transmit a packet of size P through both hops:

$$\text{tx\_time} = \frac{P}{\omega_{12}} + \frac{P}{\omega_{11}} P \frac{\omega_{11} + \omega_{12}}{\omega_{11} \omega_{12}},$$

Then, $$\omega'_2 = \frac{\omega_{11} \omega_{12}}{\omega_{11} + \omega_{12}}.$$

Following the same process with $\omega'_3$ it is possible then, to reduce the problem of backhaul bandwidth aggregation to the allocation of $f'_1$, $f'_2$ and $f'_3$ with the same constraints as in Giustiniano et al. to guarantee a fair throughput allocation among all the clients.

Once the percentage of time of each bandwidth source is computed, it is necessary to map these values into the real percentages of time that AGGRAP will use ($f_{11}$, $f_{12}$ and $f_{13}$).

From the change in notation that it has been previously done it can be clear to see that $f'_1$ accounts for the time that $AGGRAP_1$ requires to transmit bi to its clients and does not capture the time required to send the data that it could aggregate from neighboring $AP_s$. Then, $f'_2$ accounts for the percentage of time required transmitting bandwidth from $b_2$ to $AGGRAP_1$ and from $AGGRAP_1$ to its clients, which represents $f_{12}$ plus some portion of $f_{11}$. Focusing on the percentage of time to transmit data from $AP_2$ to $AP_1$, the mapping between $f_{12}$ and $f'_2$ can be seen from the percentage of time that a packet of size P spends on each of the two links given $\omega_{11}$ and $\omega_{12}$.

$$(\% \text{ of time on link 1-2}) = \frac{\frac{P}{\omega_{12}}}{\frac{P}{\omega_{12}} + \frac{P}{\omega_{11}}},$$

$$(\% \text{ of time on link 1-2}) = \frac{\omega_{11}}{\omega_{11} + \omega_{12}}$$

Then, $$f_{12} = f'_2 \frac{\omega_{11}}{\omega_{11} + \omega_{12}}$$

and $$f_{11} = f'_1 + f'_2 \frac{\omega_{12}}{\omega_{11} + \omega_{12}} + f'_3 \frac{\omega_{13}}{\omega_{11} + \omega_{13}}$$

Table 3 shows the values of $f'_1$ and $\omega'_1$ for the embodiment shown in FIG. 4 considering that all three backhaul links are of capacity $b_i = 1$ Mbps. It can be seen that after the conversion from the overlay channels to the real wireless channels, the values obtained for $f_{ij}$ are the same as the ones that could be computed using eq. (1) and eq. (2).

To solve this embodiment, it is not necessary to use the change of variables because AGGRAP is able to aggregate all the backhaul bandwidth. However, in case AGGRAP needs to select the best time allocation among the neighboring APs to provide a proportionally fair share of the backhaul capacity, using the overlay wireless channels provides a way to map a problem with recursive definitions of variables into a problem with known solutions [3, 1]. AGGRAP uses the solution described in Giustiniano et al. to select a weighted proportionally fair throughput distribution among AGGRAPs which is summarized in the appendix.

TABLE 3

Example of the mapping between the three "overlay channels" and the real wireless channels.

|  | $AP_1$ | $AP_2$ | $AP_3$ |
|---|---|---|---|
| $b_i$ [Mbps] | 1 | 1 | 1 |
| $\omega_{ij}$ [Mbps] | $\omega_{11} = 20$ | $\omega_{12} = 10$ | $\omega_{13} = 10$ |
| $\omega_j'$ [Mbps] | $\omega_j^1 = 20$ | $\omega_2^1 = 0.07$ | $\omega_3^1 = 6.67$ |
| $f_i^1$ | $f_1^1 = 0.05$ | $f_2^1 = 0.15$ | $f_3^1 = 0.15$ |
| $f_{ij}$ | $f_{11} = 0.15$ | $f_{12} = 0.10$ | $f_{13} = 0.10$ |

Experimental Evaluation

This section briefly describes the implementation of AGGRAP on off the shelf hardware and its performance on a small scale testbed. The evaluation focuses on: i) the performance implications of using an AP to both serve clients, as well as act as a client itself, ii) the assessment of the accuracy of the problem reformulation as described before, and iii) the performance gains of AGGRAP in a realistic environment. The experiments were performed in an office environment using off the shelf devices, such as laptops and Android phones.

Implementation: AGGRAP was implemented in a desktop computer with linux kernel 2.6.32 and an atheros based 802.11 PCI Express card controlled by the ath9k linux driver. The ath9k code of compat-wireless-2.6.32 has an initial implementation of multi-channel virtualization. The code was modified to enable TDMA scheduling, while limiting any associated loss in performance.

To control that the last packet sent before switching was the one indicating that AGGRAP is going to power save mode, it i) first stopped the upper layer queues and then started the switching process, and ii) reduced the number of hardware queues from "4" to "1". The number of "4" queues is to enable wireless multimedia extensions (WME).

The hardware queue length was reduced to increase the accuracy of the switching events.

Furthermore, the silencing mechanism by which AGGRAPs can silence their contention domain to mask the disappearance from their channel of operation to their clients was implemented. As with the original design requirements, our clients remain totally unmodified, thus allowing performing experiments with laptops, as well as smartphones.

Experimental Setup:

The invention testbed consists of two AGGRAPs, one Linksys WRT54GL AP and three machines acting as servers on the wired network. To study the impact of different backhaul capacities on the performance of AGGRAP we use traffic control (tc) to rate limit the backhaul links. To study the impact of different wireless capacities, the transmission rate of $AP_s$ were modified. Dell laptops (latitude D620) running ubuntu 8.04 (linux kernel 2.6.24) were used to connect to the AGGRAPs to perform the majority of the throughput experiments. In addition, Android phones (e.g. we have tested an HTC Nexus One and a Samsung Galaxy SII) were also tested connecting to the AGGRAPs and obtained the same performance as that obtained the laptops. Downlink Iperf TCP connections were used to measure the throughput achieved in each scenario. All experiments were conducted during night to avoid interference from networks that do not belong to the test bed.

Single-Radio Multi-Channel Virtualization:

Before proceeding with the performance evaluation of AGGRAP as a whole, it needs to be evaluated whether single-radio multi-channel virtualization incurs any overhead when one of the virtual interfaces acts in AP mode. To this end the network depicted in FIG. 8(b), was deployed in which an AGGRAP acts as an AP and as a client of a neighboring AP. AGGRAP acts as an AP in channel 1 (2.412 GHz) while the neighboring AP is set to channel 5 (2.432 GHz). Using this network topology, a first experiment was performed to show the evolution of the throughput obtained in each interface depending on the percentage of time devoted to it. In this experiment two TCP connections were simultaneously started: i) one from AGGRAP to its client; and ii) one from the backhaul of the neighboring AP to AGGRAP. No restrictions to the backhaul capacity of the APs were applied, thus allowing assessing the WiFi network alone. All APs transmit at the maximum physical layer transmission rate possible in 802.11g (i.e. ~54 Mbps).

Figure 6:
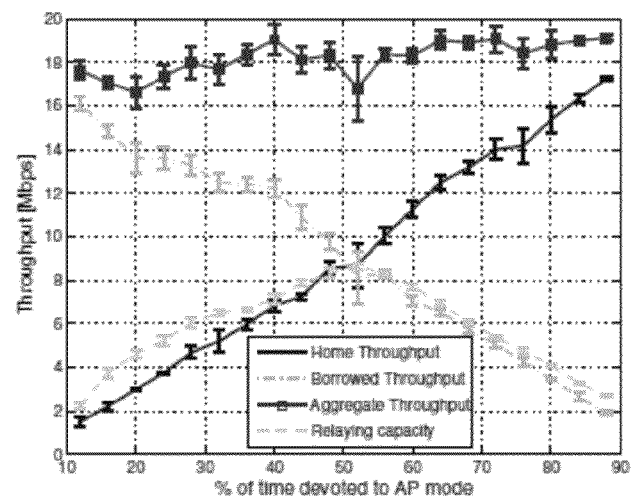
FIG. 6 is a comparison between the relaying capacity and the single-hop link capacity.

FIG. 6 shows the results of the experiment. "Home Throughput" is the bandwidth obtained in the link between the AGGRAP and its client and "Borrowed Throughput" the bandwidth that AGGRAP is able to receive using the neighboring AP. The line labeled "Aggregate Throughput" in FIG. 6 refers to the sum of "Home Throughput" and "Borrowed Throughput" which shows the global utilization of the wireless card.

FIG. 6 shows that Home Throughput increases linearly with the percentage of time that the AP serves traffic to its client. This is to be expected since no restriction on the AP's backhaul capacity exists. Similarly, as the percentage of time in AP mode increases, the invention effectively reduces the amount of time that the AP receives traffic from the neighboring AP. More importantly, if the two metrics are add up, the aggregate throughput remains almost constant across the different experiments, indicating that the overhead of switching from AP to client is fixed and only impacts overall aggregate throughput by 3.2 Mbps. The invention implementation requires 1.5 ms to switch from one virtual interface to another that is operating on a different frequency. But it can be observed that after switching frequency and sending the packet notifying the neighboring AP it is back from power saving, there is a period of time in which the card does not transmit any data. This period has a mean duration of 6 ms and is due to the design of the interactions between the driver (ath9k) queues and higher layers (mac80211). As it can be observes, using a TDMA cycle of 100 ms, the impact of switching is of 15% of the capacity of 802.11 without switching.

In the presence of a 2-hop flow from the neighboring AP to the client, one would expect to observe a throughput that is the minimum of the Home and Borrowed Throughput. The invention instantiates such a connection across the network (in isolation this time) and vary the amount of time that the Home AP serves its client. The results were plotted as Relaying Throughput. Indeed, the line nicely tracks the minimum of the Home and Borrowed Throughput.

Lastly, it can be observed that the total utilization of the wireless card when performing channel switching reaches at most 19 Mbps. This value is actually $\omega_{11\text{-}Switching}=0.86\times\omega\omega_{11\text{-}No\text{-}Switching}$. This shows the impact of the channel switching overhead.

Therefore, virtualization of the WiFi card to act as both AP and client on different frequencies does lead to the expected behavior in the invention implementation.

Formulation Validity:

In previous paragraphs it has been showed that using a change of variables it is possible to map the formulation of the AP-based aggregation problem to the client-based one and, then, apply the best solution from the ones already proposed in the literature.

Change of Variables:

The change of variables that helps mapping the new optimization problem into a known one consists on predicting the capacity of the two-hop link between a neighboring AP and AGGRAPs clients ($\omega'_2$) based on the wireless capacity of each hop in the communication ($\omega_{11}$ and $\omega 12$). Then, $$\omega'_2 = \frac{\omega_{11} \times \omega_{12}}{\omega_{11} + \omega_{12}}/.$$

The changes of variables comes from measuring the transmission time of a packet throughout in each link and add these times to find the average capacity in the two links. This assumption is perfectly valid in paper, but we need to confirm that this is the case in our prototype and that the processing time of the packets or the buffering performed in AGGRAP before re-transmitting packets to the clients do not affect $\omega_2$.

To this end, $\omega_{12}$ was measured for all the transmission rates of an 802.11g AP. This simulates the effect of having the neighboring AP farther away with lower wireless capacity. To measure $\omega_{12}$ 5 iperf tests of 50 seconds each between the neighboring AP and AGGRAP were performed using only one virtual interface in client mode.

AGGRAPs were also measured relaying capacity varying the percentage of time devoted to the AP interface. The maximum relaying capacity in each of these tests corresponds to the experimental $\omega_2$. In addition, $\omega_{11}$=22.2 Mbps was measured and compute the expected $\omega_2$ for each of the experiments.

The values estimated in absence of switching will actually be reduced when performing channel switching. And now $$\omega'_2 = \frac{\gamma^2 \omega_{11} \omega_{12}}{\gamma(\omega_{11} + \omega_{12})} = \gamma \times \frac{\omega_{11} \omega_{12}}{\omega_{11} + \omega_{12}}.$$

where $\gamma$=0:8 is a constant that takes into account the ratio between the experimental and the expected $\omega_2$. It can be seen then that the change of variables maps AGGRAP's formulation into a client-based backhaul aggregation system.

Fairness:

Mapping the AP-based aggregation problem to the client-based one offers the possibility to optimize for the same goals that have been explored in the literature [1, 3]. However, performing the optimization computation in a different point of the network has some implications in the final result. Client-based solutions optimized for individual maximum throughput as in Kandulaet al. or per-client fairness as in Giustiniano et al. However, in the AP-based solution it is possible to optimize for the AP's maximum throughput delivered to its users or per-AP fairness.

Figure 7:
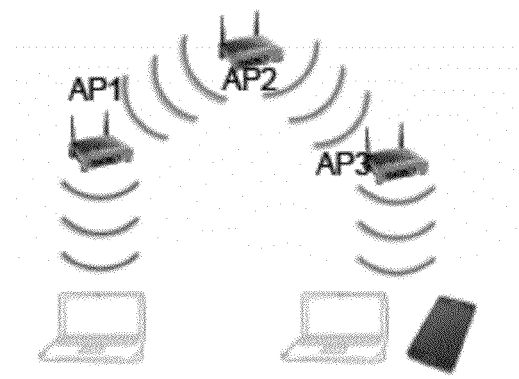
FIG. 7 is an embodiment network deployment of the fairness experiment of the present invention.

Considering the network deployment shown in FIG. 7 where laptop1 connects to AGGRAP1 and laptop2 and the Android phone connect to AGGRAP3 and the capacity of each backhaul is 3 Mbps. All APs are in range of each other with maximum wireless capacity (20 Mbps) and clients communicate to their AP with the same wireless capacity. Then, an experiment is run in which laptop1 and the Android phone open 5 TCP downlink flows per backhaul they are using while laptop2 only opens one downlink TCP flow per backhaul. It can be observed that AGGRAP1 and AGGRAP3 offer the same bandwidth to the sum of their clients, but the Android phone obtains a greater share of the 4.5 Mbps that AGGRAP3 is offering. This is because the control of the throughput obtained in each wireless link is done at the AP instead of at the clients. And the sharing of the aggregate capacity of AGGRAP3 is controlled by the TCP congestion control that provides per-flow fairness.

Aggregation Capacity:

To explore the maximum aggregation capacity of AGGRAP, the network topology depicted in FIG. 8(b) it was used. The capacity of the home backhaul was setup to 3 Mbps and explored what is the maximum bandwidth that can be aggregated from a neighboring AP with a perfect channel—the neighboring AP is transmitting at a physical rate of 54 Mbps. In this scenario AGGRAP provides a total throughput of 9.9 Mbps to its client: 3 Mbps coming from the home backhaul and 6.9 Mbps gathered from the neighboring AP. The operation point of AGGRAP is to devote 40% of the time to collect bandwidth from the neighboring AP and the remaining 60% to serve the aggregated throughput to its client.

Client- Vs AP-Based Bandwidth Aggregation:

It has been seen in some of the embodiments that is technically possible to perform bandwidth aggregation using a single-radio AP and that it yields benefits for different types of WiFi clients. However, the appearance of multi-hop wireless links increases the complexity of the resulting network architecture. It is necessary then to analyze what are the drawbacks of using AGGRAP and quantify its potential benefits to assess its viability.

Figure 8:
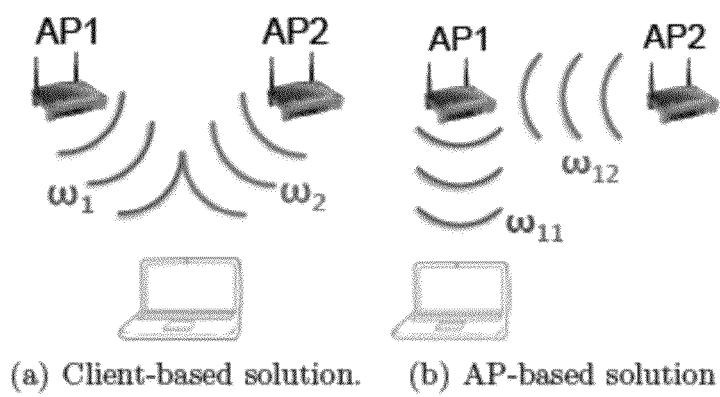
FIG. 8 is an embodiment of the network configuration of the client-based and AP-based solutions.

In order to perform an easy to follow comparison between both systems, an analytical computation of the maximum bandwidth each system can aggregate in a scenario that can be solved with back of the envelope calculations is made. The scenario selected is: one client that can see a neighboring AP with the same quality as its home AP ($\omega_2 = \omega_{12}$). FIG. 8 shows another embodiment of the network configuration of the client-based and AP-based solutions for the scenario selected for the comparison.

Figure 9:
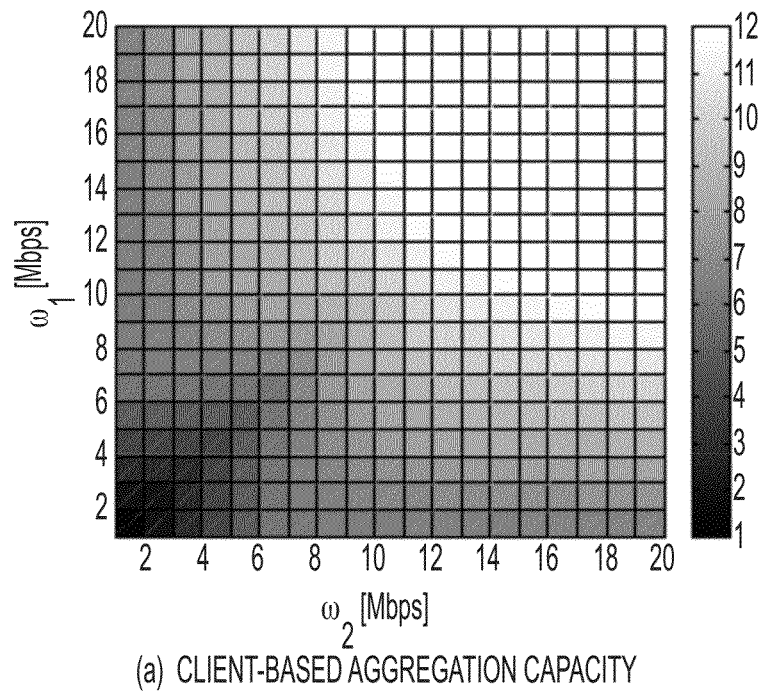
FIG. 9 shows an example of the aggregation capacity of client- and AP-based systems with a home and a neighboring backhaul of 6 Mbps, according to an embodiment.
Figure 9:
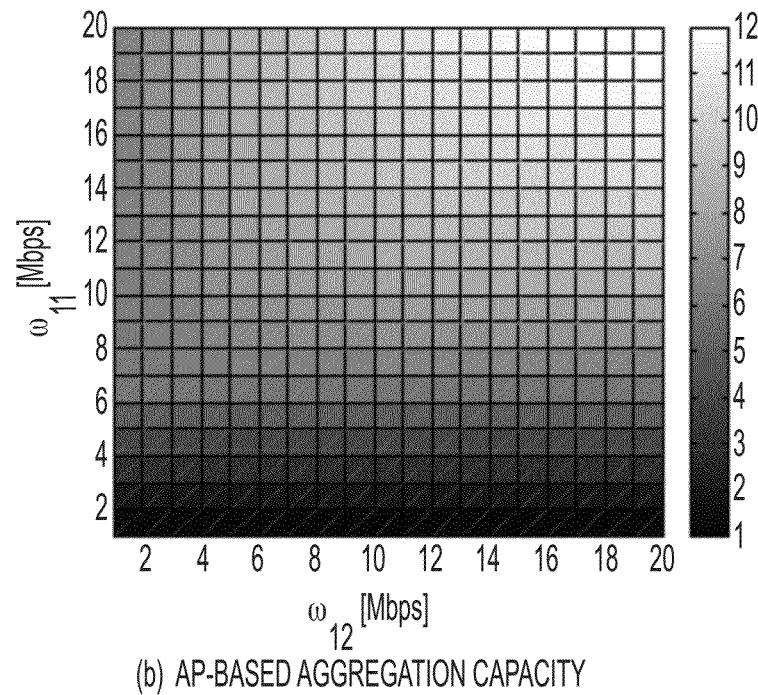

All Backhauls are the Same:

Considering that each AP is connected to a 6 Mbps wired backhaul, the throughput that a client-based solution can offer for different wireless capacities is depicted in FIG. 9(a). Comparing both figures FIG. 9 (a and b), it can be observed that the client-based solution is able to fully aggregate the available 12 Mbps of the backhaul links for a wider range of wireless channel capacities.

Another difference between both systems shows up in these figures as the client based shows no preference for the AP with better quality while the AP-based solution is tied to a wise decision of the AP selected. This can be seen from the fact that FIG. 9(a) is symmetric while FIG. 9(b) is not. Hence, if the home AP wireless capacity is very low, the client will obtain at most that capacity regardless of the channel quality of the link to the neighboring AP.

Different Backhauls:

Now, focusing in the same scenario described before, the capacity of the backhaul links is 1 Mbps for the home backhaul and 10 Mbps for the neighboring one.

Figure 10:
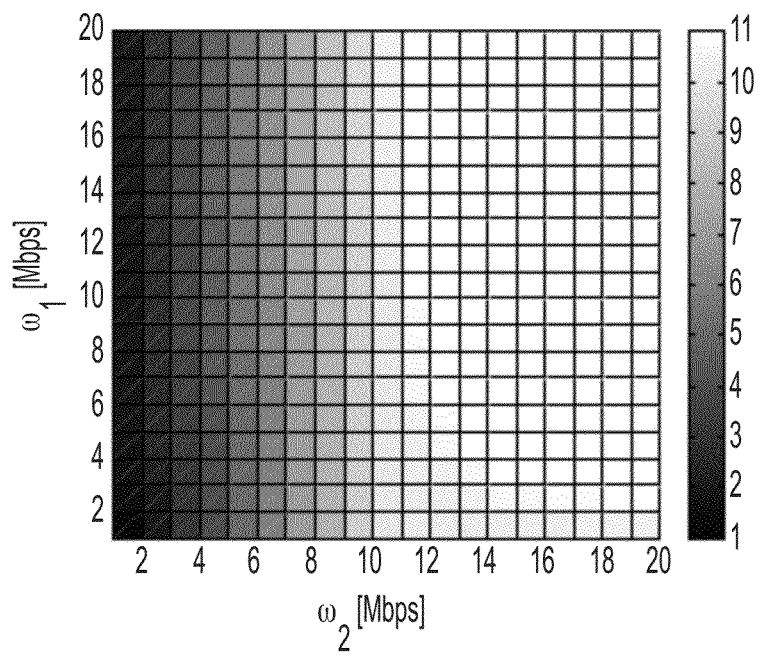
FIG. 10 shows an example of the aggregation capacity of client- and AP-based systems with a home backhaul of 1 Mbps and a neighboring backhaul of 10 Mbps, according to an embodiment.
Figure 10:
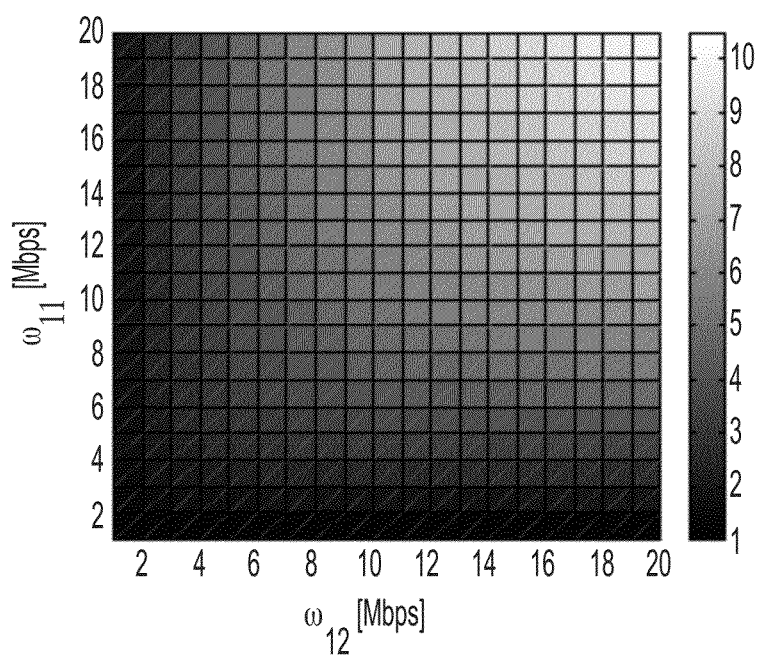

FIG. 10(a) shows the results for a client-based solution while FIG. 10(b) shows the throughput that AGGRAP provides to its clients. Comparing the results from both systems we observe that:

The client-based solution achieves 0.5 Mbps higher throughput.

AGGRAP cannot aggregate when one of the two wireless links is bad.

The client-based solution selects the neighboring AP to collect the bandwidth.

Respect to no aggregation, AGGRAP offers at least 4 times higher throughput to its clients when $\omega12$>5 Mbps:

In this scenario, the home backhaul contributes 9% of the total capacity. Then, the benefit of obtaining this capacity is minimal compared to the neighboring capacity. The result of this situation is that when the link to the neighboring AP offers higher capacity than the home backhaul, the maximum throughput is obtained by connecting to the neighboring AP. When users are at home, they use their home AP and aggregate as much as possible regardless of the imbalance in capacity. Nevertheless, this scenario shows the importance of the AP selection algorithm when users are not at home.

Further reducing the capacity of the home backhaul would lead to a situation in which AGGRAP becomes a relay of the neighboring AP. In case the home AP is in between the client and the neighboring AP, the client will obtain higher throughput using the home AP as a relay than trying to directly connect to the neighboring AP.

This invention, points out a fundamental problem with prior WLAN bandwidth aggregation solutions: their need for client modifications makes their deployment cost prohibitive. To unleash the potential of those solutions, the present invention provides and implements a system that can approach the benefits of client-based solutions requiring modifications only on the APs. The formulation of such a system is showed to be a variation of the original problem definition, and propose an architecture (AGGRAP) to realize it. The performance of AGGRAP with that of client-based solutions has been compared and showed that, while less efficient aggregating bandwidth, the former can still yield substantial throughput increases. AGGRAP further offers throughput increases to a variety of unmodified WiFi devices (e.g., laptops and different Android phones).

A person skilled in the art could introduce changes and modifications in the embodiments described without departing from the scope of the invention as it is defined in the attached claims.

Acronyms
ADSL Asymmetric Digital Subscriber Line
AP Access Point
NAV Network Allocation Vector
TDMA Time Division Multiple Access
WIFI Wireless Fidelity
WLAN Wireless Local Area Network

The invention claimed is:

1. A method for bandwidth aggregation in a dedicated access point, said method comprising providing communication to at least one wireless client device through a connectivity to said corresponding dedicated access point, as well as locating and recognizing a plurality of neighboring access points, wherein the method comprises:
  a) notifying, by said dedicated access point, a predetermined absence period to said at least one wireless client device to which said dedicated access point provides communication;
  b) during said predetermined absence period, said dedicated access point becoming a client to at least a second access point of said plurality of neighboring access points;
  c) receiving, by said dedicated access point as a client, backhaul data corresponding to a backhaul bandwidth of said at least second access point and aggregating said received backhaul data from said at least second access point to said dedicated access point's own backhaul data; and
  d) sending, by said dedicated access point, said aggregated backhaul data to said at least one wireless client device after the predetermined absence period has lapsed, said at least one wireless client device communicates only with said dedicated access point from among said plurality of neighboring access points during the sending of said aggregated backhaul data.

2. The method according to claim 1, wherein the method comprises performing said dedicated access point, said connectivity, and said bandwidth aggregation by using a single-radio access point.

3. The method according to claim 2, wherein said bandwidth aggregation performed by said dedicated access point involves aggregating the spare bandwidth of said at least second access point.

4. The method according to claim 3, wherein the method further comprises performing said bandwidth aggregation regardless of the channel operation of the involved access points.

5. The method according to claim 1, wherein said step d) is performed immediately after said predetermined absence period has lapsed.

6. The method according to claim 2, wherein said connectivity between the access points is performed being said access points in communication range.

7. The method according to claim 1, wherein said predetermined absence period has a value such that said at least one wireless client device maintain association to said dedicated access point.

8. The method according to claim 7, wherein said absence period value is calculated by using a Network Allocation Vector (NAV), said absence period value having a maximum duration of 32 msec.

9. The method according to claim 1, wherein said step b) is performed when the backhaul bandwidth utilization of said dedicated access point exceeds 80% of said dedicated access point's capacity.

10. The method according to claim 9, wherein the method comprises announce, said dedicated access point to said at least second access point, through Beacon frames said backhaul bandwidth capacity as well as their available-for-aggregation throughput in order to enable a derivation of an appropriate Time Division Multiple Access (TDMA) schedule.

11. The method according to claim 10, wherein the method further comprises prioritizing traffic becoming from said at least one wireless client device in said dedicated access point in order to ensure that spare capacity of said backhaul bandwidth is used for assistance.

12. The method according to claim 1, wherein the method comprises performing said backhaul bandwidth aggregation by guaranteeing an equal and fair sharing between the access points.

13. A system for bandwidth aggregation in a dedicated access point, said system comprising:
  at least one wireless client device and a dedicated access point to which said wireless client device establishes a communication; and
  said at least one dedicated access point having a connectivity capability to locate and recognize a plurality of neighboring access points,
  wherein said dedicated access point further comprises a processor configured to:
  notify a predetermined absence period to said at least one wireless client device to which it provides communication;
  act as a client to at least a second access point of said plurality of neighboring access points during said predetermined absence period;
  receive backhaul data corresponding to a backhaul bandwidth of said at least second access point and aggregate said received backhaul data from said at least second access point to its own backhaul data; and
  send the aggregated backhaul data to the at least one wireless client device after the predetermined absence period has lapsed,
  wherein said at least one wireless client device communicates only with said dedicated access point from among said plurality of neighboring access points during the sending of the aggregated backhaul data.

14. The system according to claim 13, wherein communication between said plurality of neighboring access points and communication between said dedicated access point and the at least one wireless client device is established by a single-radio access point, wherein said single-radio access point is located in said dedicated access point, and wherein in said single-radio access point each access point is located in a different communication channel or in the same communication channel.

15. The system according to claim 14, wherein in said single-radio access point solution does not structurally modify said at least one wireless client device during said communication.

16. A dedicated access point for bandwidth aggregation, said dedicated access point configured to provide communication to at least one wireless client device and having a connectivity capability to locate and recognize a plurality of neighboring access points, wherein said dedicated access point further comprises a processor configured to:

notify a predetermined absence period to said at least one wireless client device to which the predetermined absence period provides communication;

act as a client to at least a second access point of said plurality of neighboring access points during said predetermined absence period;

receive backhaul data corresponding to a backhaul bandwidth of said at least second access point and aggregate said received backhaul data from said at least second access point to said to said at least second access point's own backhaul data; and send the aggregated backhaul data to the at least one wireless client device after the predetermined absence period has elapsed, wherein said at least one wireless client device communicates only with said dedicated access point from among said plurality of neighboring access points during the sending of the aggregated backhaul data.

\* \* \* \* \*